May 16, 1961 K. WILFERT 2,984,415
HEATING AND VENTILATING SYSTEM FOR MOTOR VEHICLES
Filed Feb. 13, 1958 2 Sheets-Sheet 1
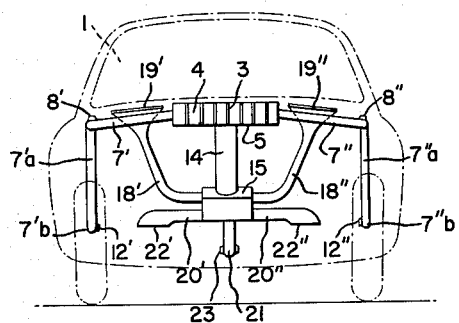
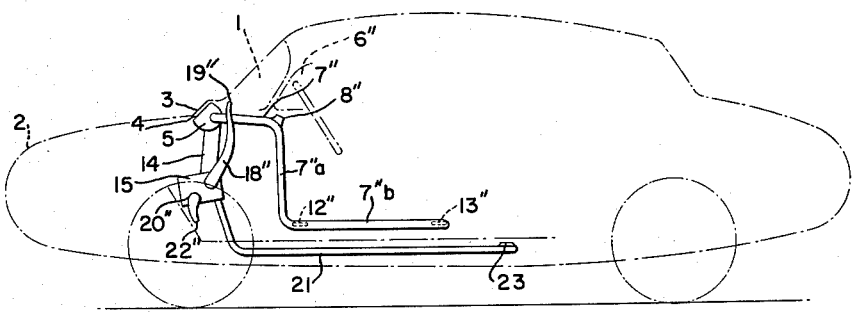
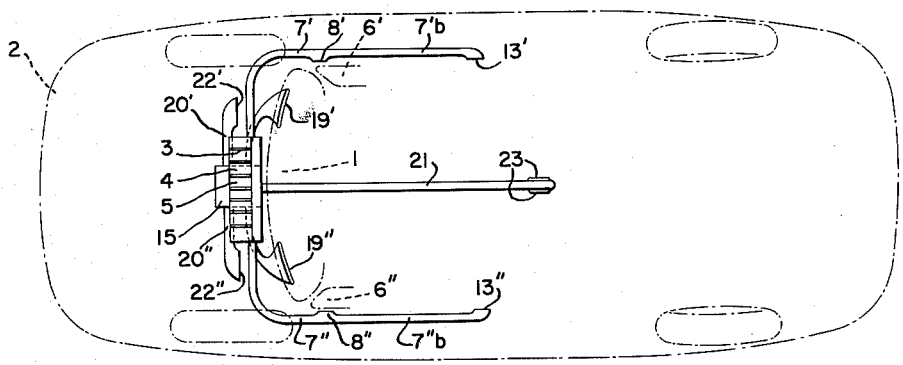
INVENTOR
KARL WILFERT
BY *Dicke and Craig*
ATTORNEYS

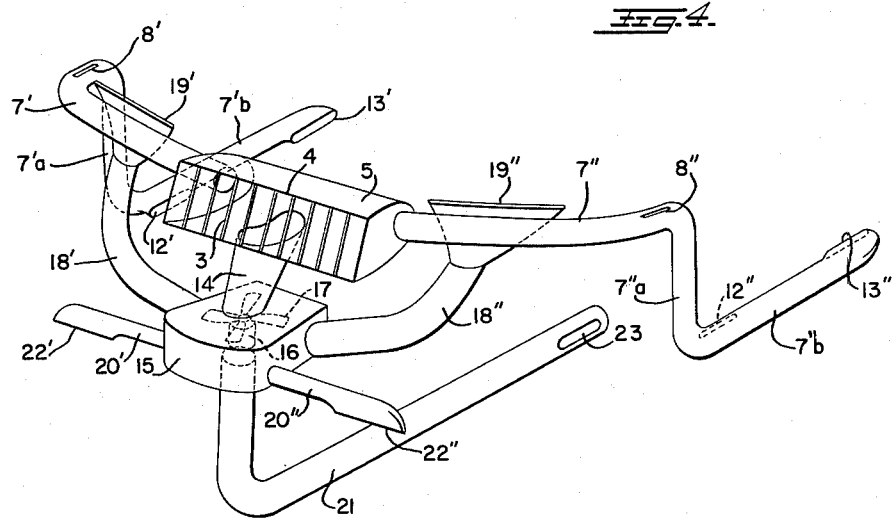

United States Patent Office 2,984,415
Patented May 16, 1961

2,984,415

HEATING AND VENTILATING SYSTEM FOR MOTOR VEHICLES

Karl Wilfert, Stuttgart-Degerloch, Germany, assignor to Daimler-Benz Aktiengesellschaft, Stuttgart-Unterturkheim, Germany Filed Feb. 13, 1958, Ser. No. 715,087

Claims priority, application Germany Feb. 16, 1957

7 Claims. (Cl. 237—12.3)

The present invention relates to an improvement and further development of a vehicle fresh air and re-circulated air ventilating and heating system, especially for motor vehicles, provided with a fresh air and re-circulated air line or conduit system leading to the defroster nozzles of the windshield, to the space below the windshield, to the side windows or panes, particularly those adjacent the windshield, and to the spaces in front of or below the front and rear seats as well as possibly also extending in the center of the vehicle body.

The present invention essentially consists in the arrangement and distribution of the air line or conduit system behind a fresh-air inlet aperture in such a manner that, ahead of a central air branch line or conduit which is adapted to be closed by a valve member, a branch line or conduit each branches off therefrom leading toward the right and left side of the vehicle, at first at the height of the side windows and thereupon following close to the vehicle floor and provided with inlet apertures within the region of the side windows and within the region of the front and rear seats which are each adapted to be closed by a respective valve member, whereas behind this valve member of the central branch line or conduit, a re-circulating air aperture adapted to be closed by the same valve member and therebehind a heater or heat exchanger with a second valve member disposed in front thereof are so installed therein that the inflowing air may be conducted in a stepless, continuously variable manner between the two extreme conditions thereof in which the inflowing air is conducted either completely through the heater or through the cross section of the line free or unobstructed of the heater; a blower or ventilator is arranged either in front or behind the line section containing the heater which draws in the air flowing either through the heat exchanger and/or through the conduit section having a free cross section, and supplies the air thereafter, depending on the position of the respective valve members cooperating with the respective branch lines or conduits, to one pair of lines or conduits leading to the windshield defroster nozzles and/or to one pair of lines or conduits leading to the space below the windshield as well as to a branch line or conduit essentially centrally disposed in proximity to the floor which terminates approximately in the center or rear region of the passenger space.

The purpose of the present invention is to provide a heating and ventilation system for a vehicle which fulfills its task completely satisfactorily yet is able to get along with the least possible number of valve members in the main line notwithstanding the numerous branch lines or conduits in the system, to relieve the blower as much as possible, and to construct the change-over from fresh air to re-circulated air as well as the change-over from heated air to unheated or fresh air or to a more or less temperature-controlled air as simply as possible.

Accordingly, it is an object of the present invention to provide a heating and ventilating system which is extremely versatile in operation, provides the necessary controls, yet is simple in structure and control, and requires relatively few control parts.

Another object of the present invention is to provide a heating and ventilating system which permits the ready adjustment between fresh air and re-circulated air in the line system thereof.

Another object of the present invention is the provision of a heating and ventilating system which relieves the blower system as much as possible of unnecessary loads.

Still another object of the present invention resides in the provision of a heating and ventilating system which offers great versatility yet utilizes relatively few control valve members, especially in the main line or conduit thereof.

A further object of the present invention resides in the provision of a fresh air and/or re-circulated air heating and ventilating system for motor vehicles which is constructed to effectively fulfill all requirements thereof within a passenger motor vehicle, especially freedom from draft without impairment of the individually controllable features thereof.

These and other objects, features and advantages of the present invention will become more obvious from the following description when taken in connection with the accompanying drawing, which shows, for purposes of illustration only, one embodiment in accordance with the present invention, and wherein:

Figure 1 is a front view, showing the motor vehicle in phantom lines, of the heating and ventilating system in accordance with the present invention, Figure 2 is a side view of the motor vehicle of Figure 1 showing the heating and ventilating system in accordance with the present invention in side elevational view, Figure 3 is a top plan view of the heating and ventilating system of the motor vehicle illustrated in Figures 1 and 2, Figure 4 is a perspective view, on an enlarged scale, of the heating and ventilating system illustrated in Figures 1 to 3 except for a modification in the air discharge apertures, and Figure 5 is a further schematic representation of an arrangement essentially similar to Figures 1 to 4 with a cross section through the line or conduit section having the heater and provided with the blower.

Referring now to the drawing, wherein like reference numerals are used throughout the various views to designate like parts, and more particularly to Figures 1 to 3 thereof, reference numeral 4 designates the air inlet aperture of a box-shaped air-collecting member 5 for trapping or collecting the fresh air. The air inlet aperture 4 is disposed below the windshield 1 and above the body member or hood 2 covering the engine compartment of the motor vehicle and is disposed behind a grating-like protective screen 3 which at the same time serves for decorative purposes of the vehicle. Two branch lines or conduits 7' and 7" lead from the side walls of the box-like member 5 which will also be referred to hereinafter as the air-collecting chamber, up to the region of the side windows 6' and 6" adjoining the windshield 1 and essentially at the height of the box-like member 5. Within the region of the side windows or panes 6' and 6'", the lines 7' and 7" are provided either with defroster-nozzle slots 8' and 8" directed against the side windows 6' and 6" (Figure 4) or with air apertures 8' and 8" of any other suitable shape and configuration (Figures 1 to 3 and 5). The slots or apertures 8' and 8" are adapted to be selectively closed by valve members 9' and 9" (Figure 5) of any suitable construction.

The lines 7' and 7" at first are bent downwardly, essentially vertically, to provide portions 7'a and 7"a within the region of the side-window defroster-nozzles 8' and 8" to pass over finally into line sections 7'b and 7"b disposed in proximity to the vehicle floor and extending essentially horizontally therealong. The line sections 7'b and 7"b are provided within the region of the bent portions in proximity to the floor as well as at the ends thereof with valve members 10' and 10" and valve members 11' and 11" so as to selectively open and close air discharge apertures 12' and 12" and air discharge apertures 13' and 13", respectively (Figure 5).

A further line or conduit section 14 leads from the bottom of the air-collecting chamber 5 downwardly which terminates in a box-shaped housing 15. A ventilator or blower 17 which may be driven, for example, by an electric motor 16 is accommodated in the housing 15. The housing 15 is so dimensioned that it simultaneously is effective as air reservoir or expansion chamber.

One pair of lines or conduits 18' and 18" branches off from the housing 15 behind blower 17 and leads to the defroster nozzles 19' and 19" at the windshield 1. A second pair of lines or conduits 20' and 20" also branches off from the housing 15 and conducts air into the space in the vehicle body below the windshield 1, whereas a central line 21 branches off centrally from the bottom wall of the housing 15 which line 21 at first extends in the direction toward the vehicle floor and then, after being bent, extends along the floor within the vehicle center up to the center or rear region of the vehicle body. Air discharge apertures 22', 22" and 23 are provided at or near the ends of the lines 20', 20" and 21, respectively. Furthermore, all of the lines 18', 18", 20', 20" and 21 which branch off the blower housing 15 are again adapted to be closed off by means of valve members 24', 24", 25', 25" and 26, respectively (Figure 5).

A heater 27 of any suitable construction, such as a heat exchanger, is installed in the branch line 14 between the air collecting chamber 5 and the blower housing 15, i.e., ahead of the blower 17, which heater 27 is so dimensioned as not to completely fill the cross section of the line 14 but to leave a free, unobstructed line section 14a. A selectively operable shifting valve member 28 is so arranged in the line 14 that it may be placed selectively in front of the heater 27 or in front of the line section 14a so as to more or less close one or the other. A re-circulated air aperture 29 is disposed in the wall of the line or conduit section 14 ahead of the valve 28 while a closure valve member 30 is also arranged in the walls of line or conduit section 14 in such a manner that in one extreme position the valve member closes off the line 14 against the chamber 5 and thereby opens up the aperture 29 whereas in the other extreme position it closes the aperture 29 and thereby opens up the line 14 to be in communication with the chamber 5. Of course, it is also understood that the valve member 30 is capable of being continuously adjustable so as to be placed into any intermediate position.

The valve members mentioned hereinabove may also be constructed or replaced by axially movable slide members or rotatable butterfly-type valve members or the like. Any other suitable valve member construction capable of performing the intended function is also usable in connection with the present invention.

As shown in Figures 1 to 4, the air discharge apertures 12' and 12" are disposed approximately within the region in front of or below the front seats and the air discharge apertures 13' and 13" approximately within the region in front of or below the rear seats, close to the vehicle body side walls whereas the discharge aperture or apertures 23 supply the center or rear part of the passenger space with fresh air or re-circulated air.

Furthermore, the operation of the installation in accordance with the present invention which will be described more fully hereinafter may be readily adjusted for either fresh air or re-circulated air and for changing from heated air to fresh or unheated air as may be readily recognized from Figure 5. Decisive for obtaining the desired results in accordance with the present invention, however, are primarily the arrangements of the valve members 28 and 30 in the line or conduit section 14.

Operation

If it is assumed that the valve member 30 is in a position in which it closes the line 14, as shown in Figure 5, and if the valve members 12' and 12" as well as the valve members 13' and 13" are closed, then the fresh air supply for the heating and ventilating system in accordance with the present invention is completely blocked off. If at the same time the blower 17 stands still, then no air circulation takes place within the vehicle and even with the heater 27 still turned on which, for example, may be a hot-water heater connected with the water circulatory system of the engine cooling system but which also may be operated in any other suitable manner, for example, electrically, no heating effect takes place due to the absence of any flow of air.

If the blower 17 is engaged or energized so as to drive air through the line or conduit system while the valve member 30 remains in the position shown in Figure 5 in which it closes the line 14 against the chamber 5, then the blower 17 draws in air through the air aperture 29 into the line 14 to fill the same with re-circulated air whereby the re-circulated air may be selectively conducted, depending on the position of the valve member 28, either through the line cross section 14a so as to leave the temperature thereof unchanged or partially through the line section 14a and partially through the heater 27 or completely through the heater 27. Depending on the position of the valve members 24', 24", 25', 25", and 26, the air may be supplied by the blower 17 in any appropriate desired manner to the branch lines 18', 18", 20', 20" and 21 branching off from housing 15.

Additionally, fresh air may be added to the re-circulated air by the opening of the valve members 12', 12", 13', and 13" which fresh air is thereby taken from the fresh air chamber 5.

If more fresh air is desired, then the valve member 30 is pivoted more in the direction toward the re-circulated air inlet aperture 29 or possibly the latter is completely closed in the extreme position of valve member 30, as the case may be. The fresh air, depending on the position of the valve member 28, as more fully described already hereinabove, may be supplied either as unheated or heated air to the lines 18', 18", 20', 20" and 21, depending to what extent the air from the air chamber 5 is permitted to flow either through the line section 14a or through the line section containing the heater 27.

The schematic showing in Figure 5 also clearly indicates that the flow of fresh air toward the lateral branch lines or conduits 7', 7", 7a' and 7a" decreases to the same extent in which the supply of fresh air stream through line 14 increases. As a result thereof, any unpleasant draft effect within the vehicle is completely avoided. Moreover, the blower 17 is not overloaded thereby. Consequently, a relatively small blower suffices which in practice means a smaller driving motor and lesser drain on the battery.

By the arrangement of the heater 27 as shown in the drawing together with the appertaining shifting valve member 28 and the re-circulated air aperture 29 together with the selectively actuatable valve member 30 which is simultaneously adapted to close the main line or conduit 14 disposed behind or to the rear of the branch lines 7' and 7", an extremely simple construction of the heating and ventilating installation is obtained which nonetheless offers a very great versatility in the different shifting possibilities thereof. Furthermore, the vehicle interior may be maintained evenly at a predetermined temperature and may be supplied evenly with fresh air without the usual effect that the simultaneous possibility of supplying the individual seats with cold or warm air is thereby in any way impaired.

While I have shown and described one preferred embodiment in accordance with the present invention, it is understood that the same is not limited thereto but is susceptible of many changes and modifications within the spirit of the present invention, and I therefore intend to cover all such changes and modifications as encompassed by the appended claims.

I claim:

1. In a vehicle provided with a windshield, side windows and seats, a heating and ventilating system adapted to operate on fresh air or recirculated air comprising a box-like member provided with an aperture exposed to the fresh air, first line means on each side of the vehicle connected to said box-like member and leading laterally rearwardly from said box-like member and provided with a plurality of air discharge aperture means, a housing forming a distributing chamber, a main line section connecting said box-like member with said chamber, said main line section including heater means and a by-pass section by-passing said heater means, said box-like member, said housing, and said main line section being within a single substantially vertical plane located essentially along the central longitudinal axis of the vehicle, second line means leading from said chamber to said windshield and including defroster nozzle means, third line means branching off from said chamber and provided with air discharge apertures for heating and ventilating the passenger space of said vehicle, said third line means including a central line extending downwardly from said chamber and rearwardly along the floor of said vehicle substantially within said vertical plane, said main line section including an aperture for admitting recirculated air, first valve means for selectively opening and closing both said aperture and said main line section in the direction toward said chamber, second valve means in said main line section for selectively conducting air through said heater means or said by-pass line section, blower means in said housing for drawing air through said main line section, further valve means in at least some of said line means for selectively conducting air therethrough.

2. In a vehicle the combination according to claim 1, wherein said first line means includes a pair of lines having each a line section extending toward the side of the vehicle essentially at the height of said box-like member, a second line section adjacent said first line section extending downwardly toward the floor of the vehicle and a third line section extending rearwardly along the sides of the vehicle, said pair of lines being provided with discharge apertures within the region of said side windows and within the region of said seats in the sections thereof extending along said floor.

3. In a vehicle the combination according to claim 1, wherein said third line means further includes a pair of lines extending laterally from said chamber to conduct air from said chamber into the space below said windshield.

4. In a vehicle the combination according to claim 1, wherein said first line means includes a pair of lines each having a first section extending laterally within the region of said side windows and provided thereat with first air discharge apertures, a second line section extending downwardly and a third line section extending rearwardly and provided within the region of said seats with air discharge apertures, and wherein said third line means further includes another pair of lines extending laterally from said chamber for supplying air into the space beneath said windshield and wherein said central line of said third line means is provided with air discharge apertures within the region of said seats.

5. In a vehicle the combination according to claim 4, wherein said vehicle is provided with front and rear seats, and wherein each third line section of said first pair of lines is provided with air discharge apertures near said front and rear seats.

6. In a vehicle, the combination according to claim 5, wherein said second line means includes a pair of lines extending laterally from said chamber upwardly to said windshield.

7. In a vehicle the combination according to claim 6, further comprising valve means for selectively opening and closing each of said second and third line means.

References Cited in the file of this patent

UNITED STATES PATENTS

| | | |
|---|---|---|
| 2,045,826 | Benolken | June 30, 1936 |
| 2,133,488 | Stearns | Oct. 18, 1938 |
| 2,235,642 | Lintern et al. | Mar. 18, 1941 |
| 2,333,818 | Raney | Nov. 9, 1943 |
| 2,592,400 | Edwards | Apr. 8, 1952 |
| 2,612,829 | Joyce | Oct. 7, 1952 |
| 2,627,218 | Katz | Feb. 3, 1953 |
| 2,738,718 | Reynolds | Mar. 20, 1956 |
| 2,876,998 | Csabi | Mar. 10, 1959 |

FOREIGN PATENTS

| | | |
|---|---|---|
| 527,025 | Great Britain | Oct. 1, 1940 |
| 705,572 | Great Britain | Mar. 17, 1954 |